Feb. 24, 1970     W. C. EDDY, JR     3,497,034
ENGINE LUBRICANT AERATION GAUGING METHOD AND APPARATUS
Filed Nov. 23, 1966     2 Sheets-Sheet 1
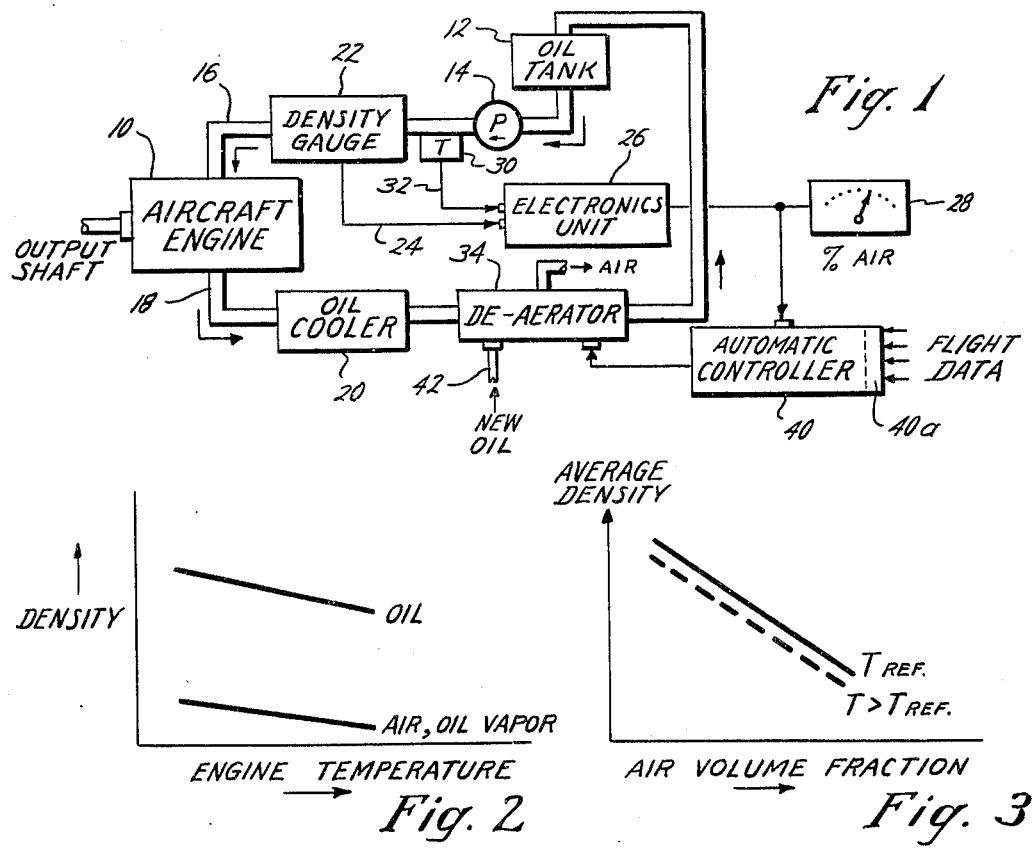
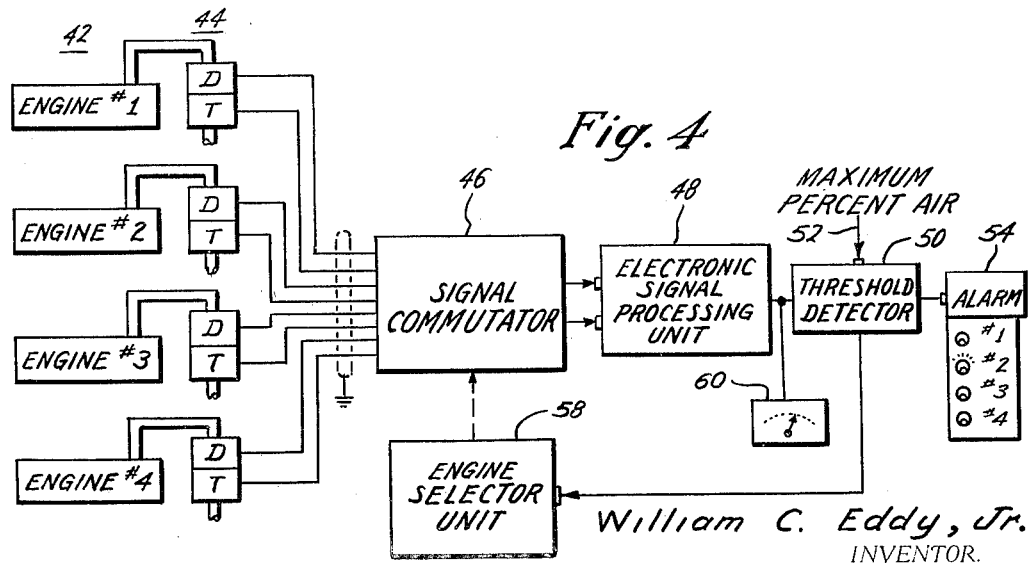
William C. Eddy, Jr.
INVENTOR.
BY James J. O'Reilly
AGENT

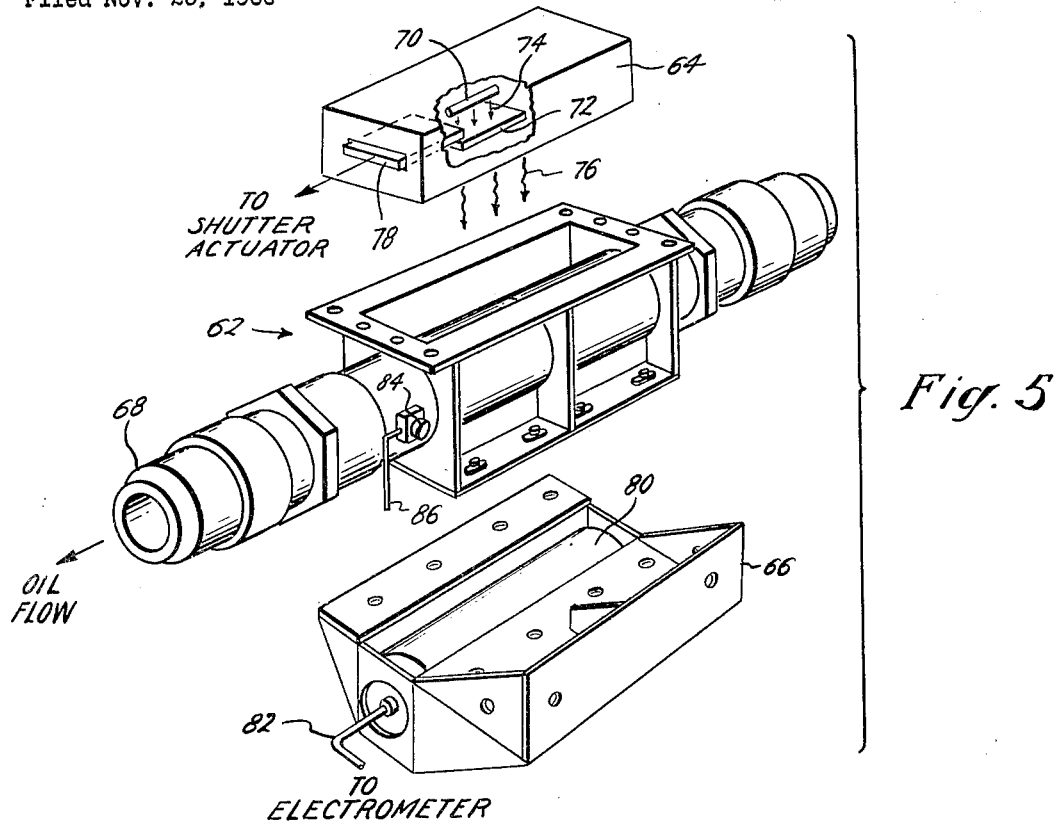
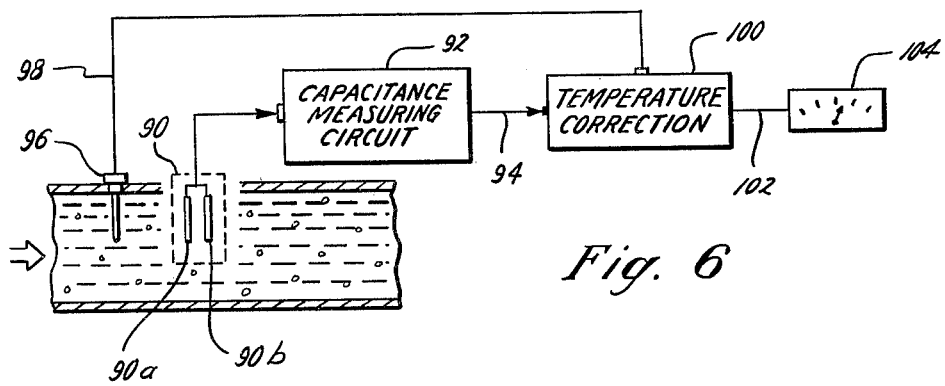

United States Patent Office 3,497,034
Patented Feb. 24, 1970

3,497,034
ENGINE LUBRICANT AERATION GAUGING
METHOD AND APPARATUS
William C. Eddy, Jr., Columbus, Ohio, assignor to Industrial Nucleonics Corporation, a corporation of Ohio
Filed Nov. 23, 1966, Ser. No. 596,573
Int. Cl. F16n *1/00;* B01d *19/00;* G01n *7/00*
U.S. Cl. 184—1                                    13 Claims

ABSTRACT OF THE DISCLOSURE

A system for measuring and/or controlling the amount of vapor, either air or oil, in lubricating oil circulating through a single or multi-engine aircraft power plant includes a density gauge, which may be either of the nucleonic or capacitive type. To compensate for variations in density as a function of temperature, the lubricating oil temperature is sensed to derive a response which is combined with the density indicating signal. The signal controls an alarm or a system for deaerating and adding additional oil to the aircraft engine if excess vapor is in the oil. In the multi-engine arrangement, a time division multiplexing unit enables a single signal processing unit to be commutated with the plural engines.

The present invention relates generally to engine lubricating systems and more particularly, to a method and means for measuring and controlling the amount of air entrained in the oil of such systems.

BACKGROUND

Engine lubricants, such as oil, are designed to reduce the friction and wear of moving parts such as bearings and gears. Air entrained in the oil reduces its lubricating power and results in the erosion and deterioration of one or more vital engine parts. This has become a problem particularly on high speed engines such as the turbojet and other aircraft engines. Aircraft powered by these engines operate in altitude regions where the atmospheric pressure and temperature varies over wide ranges. Operation in this kind of an environment tends to increase the amount of air entrained in the oil.

There has been no way of effectively measuring the amount of air entrainment. One method is disclosed in U.S. Patent 3,225,585, issued Dec. 28, 1965, to G. J. Wohnoutka. This patent describes a plug-in gauge for measuring the air in hydraulic systems. The gauging apparatus includes means for measuring the volume and pressure of the hydraulic fluid. This air gauge is limited by the readout inaccuracy problems characteristic of pressure and volume gauges.

Since no reliable oil aeration gauge has been developed, aircraft engine lubrication systems are usually over-designed by providing large de-aeration baffles in the oil tank to remove and vent air trapped in the oil. This practice has proved needless and expensive for some aircraft engines and has increased the weight of the aircraft to an unnecessary degree.

BRIEF DESCRIPTION OF THE PRESENT INVENTION

I provide a lubricant aeration gauge that continuously measures the amount of air entrained in an engine's lubrication system. According to my method, the density of the lubricant is measured and a signal is provided that is correlated with the percent air in the lubricant. The signal may be employed to automatically control the fraction of entrained air by adjusting the amount of de-aeration provided or otherwise altering the relative amounts of oil and air in a given volume of the lubricant.

In specific embodiments, I provide an aeration gauge including a radiation density to provide an output signal indicative of the percent air entrained in the oil. Other types of density sensors are disclosed to carry out my novel method. Temperature sensors may be provided to reference the density measurement to a predetermined temperature.

For multi-engine aircraft, I provide a system for monitoring the oil aeration occurring at each engine. If the air content in the oil supplied to any engine becomes excessive for the existing flight conditions, a pilot warning alarm is energized to identify which engine or engines are operating in a dangerous condition. I provide means for continuously monitoring the faulty engine and for effecting one of several safety measures such as shutting down the engine or controlling the oil flow to maintain the percent air below the acceptable maximum.

OBJECTS OF THE PRESENT INVENTION

Accordingly, it is a primary object of the present invention to provide a method and means for measuring the aeration of an engine lubricant.

It is another object of the present invention to provide an improved engine lubricant measuring and controlling system.

It is also an object of the present invention to provide an engine lubricant aeration gauge of superior accuracy.

It is yet another object of the present invention to provide an engine lubricant aeration gauge that is light weight and compact and easily adaptable to aircraft lubrication systems already in operation.

FIGURE DESCRIPTION

FIG. 1 is a block diagram of a preferred embodiment of the present invention showing my lubricant aeration gauge installed on an engine's oil system;

FIG. 2 is a graph illustrating the change in the density of air and oil versus engine temperature;

FIG. 3 is a graph illustrating the effect of temperature upon the density of the oil in the engine shown in FIG. 1;

FIG. 4 is a block diagram of an alternative embodiment of the present invention;

GENERAL DESCRIPTION

FIG. 5 is an exploded perspective view of a radiation density gauge useful in the system shown in FIG. 1; and FIG. 6 is a sectional view of a capacitance sensor useful in the system shown in FIG. 1.

With reference now to the drawings and particularly to FIGS. 1, 2 and 3, I show an oil aeration gauge for an aircraft engine 10. My gauging method and apparatus may be used on other types of engines or moving machinery as well. A typical lubrication system for the aircraft engine 10 includes an oil tank 12 and a pump 14 for sending oil into the engine over inlet conduit 16. The oil is returned from the engine 10 over a conduit 18 and transmitted through an oil cooler 20 back to the oil tank 12. This is commonly referred to as the scavenge oil return.

Air becomes entrained in the oil and reduces the lubricating qualities thereof. The entrained air reduces the average density of the oil, since its density is usually much less than that of the oil, as illustrated in FIG. 2. The entrained medium may of course either be air or oil vapor, both constituents having substantially the same low intrinsic density. The term "air" is used to include both oil, vapor and atmospheric air. The overall effect of the entrained air is to reduce the average density of the oil-air mixture, as shown in FIGURE 3. The term "average density" is synonymous with bulk density and it is used to refer to the weight per unit volume of the oil-air mixture. For purposes of simplicity, the term "density" will be used in this application to mean the bulk or average density of the oil.

According to the present invention, I position a density gauge 22 (see FIG. 1) on the inlet conduit 16 to the engine 10. Density gauge 22 measures the average density of the oil-air mixture and a signal therefrom on line 24 is coupled by an electronics unit 26. An indicator 28 may be coupled to the output of the electronics unit 26. The density gauge 22 and associated electronic circuitry may be calibrated in accordance with the characteristic curve shown in FIG. 3 so that the indicator 28 reads out the amount of air entrained in the oil. This may be in units of either percent entrained air or volume fraction of air. While the density gauge 22 is shown positioned adjacent the inlet to engine 22, it may be located at other positions in the lubrication system such as, for example, on the scavenge oil return line 18.

Since temperature affects the density of the mixture constituents (as shown in FIG. 2), it may be necessary to employ a form of temperature correction in some measurement applications, wherein the temperature of the oil varies over a wide range. To accomplish this correction, a temperature sensor 30 is located adjacent to the density gauge 22 to provide over line 32 a signal proportional to the temperature of the oil-air mixture entering the engine 10. The electronics unit 26 automatically corrects the density signal for variations in temperature so that, for a given volume fraction of air, the reading of indicator 28 will remain substantially invariant. Suitable electronic circuitry for accomplishing this correction will be apparent to those skilled in the art. Reference may be had to a copending application Ser. No. 371,883 of Glenroy Barnett, now Patent 3,368,389, assigned to the same assignee as the present application.

OPERATION OF THE PRESENT INVENTION

In the operation of the present invention, the aircraft engine may be operated at such a high speed or in an environment, such that the percent air in the oil rises. Normally, this air is removed by the de-aerator unit 34 located in the scavenge return line 18. This unit may comprise a series of baffles located near the top of the oil tank 12. If the capacity of the de-aerator 34 is insufficient, an excess amount of air may remain entrained in the oil and the engine parts may face incipient failure. Density gauge 22 responds to the amount of entrained air and transmits a signal to the electronics unit 26 for indication upon meter 28. By mounting the meter 28 on the pilot's control panel, he is made immediately aware of the potentially hazardous operation of the engine. He may desire to take some sort of emergency action such as shutting down the engine, provided, of course, backup power is available.

AUTOMATIC CONTROL EMBODIMENT

While an indication and warning system may be suitable in certain instances, it may be preferred to automatically control the amount of air in the oil as provided by my improved control system.

I provide an automatic controller 40 responsive to the signal from the electronics unit 26. The automatic controller 40 is coupled to the de-aerator 34 to alter the relative volume of air to the volume of oil circulating in the lubrication system. The signal from the automatic controller 40 may be used either to vary the amount of new oil added over conduit 42 or to increase the efficiency of air removal by adjusting baffles in the de-aerator 34.

Since the maximum acceptable percent entrained oil may vary somewhat with the aircraft's operating conditions, it may be desirable to employ in the automatic controller 40 a computer section 40a receiving input flight data from various sensors located around the aircraft. These sensors respond to operating altitude, barometric pressure, angle of attack, throttle demand, aircraft weight, and other flight variables. The automatic controller 40 would continuously maintain the percent air below the maximum value consistent with the type of engine and prevailing operating conditions. The automatic controller may be either of the continuous or discontinuous type. The former type of control system is disclosed in U.S. Patent 2,955,206, issued Oct. 4, 1960, to P. Spergel et al. and assigned to the same assignee as the present application.

MULTIPLE ENGINE MONITORING

Certain types of aircraft have two or more engines and it is required to monitor the oil aeration occurring at each engine.

With reference now to FIG. 4, I provide a system for monitoring the density of the oil flow to each of the engines 42 and for detecting when the aeration in any one of the engine oil flows becomes excessive. An aeration gauge 44 is provided on the inlet conduit of each engine. Each aeration gauge 44 includes a density transducer D and a temperature transducer T. Signals from the aeration gauges 44 are transmitted to an electronic signal processing unit. In a preferred manner, I time-share the operation of the electronic signal processing unit by switching the signals from one aeration gauge to the next by means of a signal commutator 46. The commutator 46 may be a stepping switch, either electronic or mechanical, that connects the output lines of the aeration gauges 44 to the input terminals of an electronic signal processing unit 48 in a sequential manner. A threshold detector 50 compares the percent air measured by each aeration gauge 44 with a maximum percent air signal on line 52. The threshold detector 50 energizes an alarm 54 having a bank of lights or other indicators.

In the operation of the multiple engine monitoring system, the signal commutator 46 connects the aeration gauge signals, in seriatim, to the signal processing unit 48 and threshold detector 50. If, for example, the percent air in the oil supplied to engine No. 2 becomes excessively high, the alarm unit 54 is energized and the indicator light for engine No. 2 is lit on the operator's control panel. Provision may also be made to interdict the periodic stepping motion of the signal commutator 46 by means of an engine selector unit 58 coupled to the threshold detector 50. The engine selector 58 maintains the position of the signal commutator 46 to enable the aeration gauge associated with engine No. 2 to be continuously monitored. If more than one engine is operating in a dangerous condition, the commutator 46 may be switched back and forth between the two to enable the pilot to continuously monitor the troublesome engines. The percent air entrainment may be registered on a suitable meter 60. The pilot may then take appropriate corrective action in the event the emergency condition exists for a prolonged period of time.

PREFERRED AERATION GAUGE CONSTRUCTION

Referring now to FIG. 5, the aeration gauges described in FIGS. 1 and 4 may take the form of a radiation density gauge 62. The gauge 62 includes a radiation source housing 64 and a detector housing 66 positioned on opposite sides of an oil conduit 68.

A variety of nucleonic techniques are available for radiation density measurements.

There are three forms of radiation to consider, viz., gamma photons, beta particles, and neutrons, and two basic methods of performing the measurement using either scattering or transmission. Neutrons may be eliminated from consideration due to source intensity and shielding considerations. Neutron sources yield a relatively low output contrasted to typical beta and gamma ray sources. Also, a large bulk of low-Z material is required to shield neutrons. This bulk of material would be inappropriate for use in the small geometrical confines in and around turbojet engines.

All radioactive sources which beta decay emit particles with a continuous energy spectrum up to some maximum value, $E_{max}$. Typical transmission curves for continuous beta decay spectra resemble pure exponential attenuation curves except for a finite upper limit. However, the exact characteristics of these exponential curves are gometry-dependent. A more quantitative view is obtained by considering the thickness of material which will just stop the maximum energy beta particle in the decay spectrum. This thickness of material is then referred to as the maximum range and is somewhat limited for beta sources.

Gamma sources may be the most promising for this application. There are two possible sources of gamma rays: the first type of gamma ray source is one made up of radioactive nuclei which emit monoenergetic gamma rays in the decay process. X-ray generators are another example. The second type is bremsstrahlung which is the gamma radiation emitted due to the interaction of a charged particle (usually beta rays) and the electric fields of the nuclei of some tarket material. Even though its yield efficiency is low, a Kr–85 bremsstrahlung source is highly favored from the radiation handling standpoint, since Kr–85 is an inert gas which disperses rapidly in event of a rupture of the source. Several curies of Kr–85 generate sufficient bremsstrahlung radiation for the measurement of the oil density.

The beta source 70 may be mounted in a shielding housing 64 mounted on the top side of oil conduit 68. A target material 72 such as aluminum is mounted in the path of the beta particles 74 leaving the source 70. The resulting bremsstrahlung radiation 76 exits through a radiation aperture in the source housing 64 adjacent to the conduit 68. A movable shutter 78 may be provided in the source housing 64 to stop the emission of radiation flux from the target 72.

With respect to the detector to be selected, there are three main types of nuclear radiation detecors in common use, namely, gas-filled chambers, scintillation detectors, and the solid state detectors. From these, an ion chamber 80 may be the most promising choice for the following reasons.

The ion chamber operates at a relatively low voltage and collects the ions generated by incident radiation. It can be operated either in a pulse counting mode or in an average current detection mode. The ion chamber operating in the latter mode has a capability of detecting high radiation intensity with long service life and with better efficiency than either GM tubes or proportional counters. The higher efficiency is obtained by filling the chamber with a high atomic number gas at a high pressure. The current from an ion chamber is measured with an electrometer amplifier (not shown) coupled to the chamber 80 by a cable 82. Both the amplifier and the input impedance exhibit drifting and aging characteristics. By proper use of a standardization mechanism, the drift problem can be controlled. It is clear from the above discussions that the ion chamber may be preferable for use in the oil aeration gauge of the present invention. Only in application whereby mounting space is at a premium would it be perhaps more advisable to use the solid state type of radiation detector.

The source-detector geometry shown in FIG. 5 will cover slightly over 80% of the sampling volume of the flow tube. The shielding plates in FIG. 5 can be opened up to cover 100% of the sampling volume. This, however, will add considerably more to the unwanted structure scatter signal than it would to the useful oil attenuation signal. One hundred percent sampling can be achieved also by using two source-detector systems similar to the geometry of FIG. 5 by mounting one system in vertical position and another in horizontal position. This will allow better averaging of density measurement if the density distribution within the sampling volume is not uniform. For the present application, two sources and two detectors are not recommended because it is felt that the turbulent character of the flow will provide uniform averaging without sampling 100% of the cross-sectional area.

A temperature probe 84 is mounted in the sidewall of conduit 68 to detect changes in oil temperature. Cable 86 extends from the probe 84 to required electronic data handling equipment (not shown).

In order that the signal processing electronics be simplified as much as possible, a linear temperature probe such as a platinum resistance wire offers advantages over most other thermal sensors. The resistance of the platinum wire varies almost linearly with temperature over a wide temperature range; in addition, long term stability characteristics are quite good. The thermal detection apparatus would include a bridge network to yield a voltage proportional to temperature within 1%. Such a network would be located in the data processing electronics in the aircraft cabin, in order to minimize the effects of ambient temperature variations. Since the oil aeration is a rather weak function of temperature, and since cross-sectional thermal variations in the pipe may be sinificant, accuracy levels in excess of 1% for the temperature measurement would be unrealistic.

The electronic data processing system handles two signals, the ionization chamber output and the temperature probe output, transmitted over cables 82 and 86 respectively. These signals are converted into an output signal proportional to the air volume fraction within the conduit 68.

This air volume fraction is represented mathematically by the equation $$v_a = 1 - (K_1 - K_2 i) - (K_1 - K_2 i)\alpha \Delta t \qquad (1)$$

where $i$ is the ionization chamber current, $\Delta t$ is the probe temperature less a reference temperature, and $K_1$, $K_2$ and $\alpha$ are constants. A sampling scheme is to be employed by which a single electronic package can be used to process the electrometer and temperature probe signals that are produced at each individual engine in an operational system. A block diagram indicating the necessary electronic functions for a four engine operational system is given in FIG. 4.

One of the most significant factors influencing the overall system response time involves the location of the temperature sensing head 84. This sensor might be placed in the wall of the pipe as close as possible to the oil itself without actually penetrating the wall. The sides of the probe 84 should be insulated thermally from the metal of the pipe, while the head itself should be in intimate thermal contact with the metal closest to the oil flow, the entire sensor being hermetically sealed to the pipe. Alternatively, the sensing head might protrude into the region of oil flow and be hermetically sealed in such a position. Through such schemes, the probe 84 would be able to respond quickly to variations in the temperature of oil within the conduit 68 without significantly impeding the flow therein. However, it should be realized that short term temperature variations across a cross-section of the fluid flow might typically amount to 1% of the absolute temperature, and such variations would limit the accuracy realizable with state-of-the-art temperature measurement devices.

The low signal level developed by the ionization chamber implies that an electrometer must be located as nearby as possible. Since the environment of the nuclear source and detector is approximately 400° F. due to the proximity of exhaust shrouds, the electrometer would probably be positioned as far as ten feet from the ionization chamber. Due to the capacitance of the required leads, response time of the source-detector system necessarily would be of the orde rof several hundred milliseconds.

All other signal processing electronic apparatus is to be located in the more favorable temperature environment of the aircraft cabin. Temperature stabilization of critical components is to be achieved with a temperature-controlled oven operated at a constant temperature somewhat higher than the ambient cabin temperature. The use of chopping circuitry to permit employment of digital techniques with their inherently higher stability characteristics may be preferred in some installations.

Due to the proximity of the electrometer to high temperature regions, the thermal behavior of the electrometer is most critical in the evaluation of overall accuracy. As an indication of the required accuracy level, an example is considered. For a typical system, a 10 curie Kr–85 source would produce current on the order of $10^{-8}$ amperes in the ionization chamber, the exact current being a sensitive function of the mean density of the oil.

Interest may be greatest in the range of oil aeration values from 0% to 20% air volume fraction. If the radiation passes through 1.7 inches of non-aerated oil (0% aeration, $\mu=0.17$ cm.$^2$/gm. at 100 kev. for carbon, $\rho \simeq 1.00$ gm./cm.$^3$), its intensity would be attenuated to roughly one-half its initial value. If the radiation passes through 1.7 inches of oil aerated to the 20% air volume fraction level, the effective value of $\rho$ would decrease to approximately four-fifths of its value at zero air volume fraction while the mass attenuation coefficient would remain essentially unchanged; as a result, the radiation would be attenuated less strongly. Thus, the electronics system must be able to detect a change in transmittance from 0.47 to 0.55 over the oil aeration range from 0% to 20% air volume fraction, a transmittance change of 16 parts per hundred per 20% air volume fraction or eight parts per thousand per one percent change in oil aeration. In terms of requirements on the electronics, the electrometer must be able to operate with an input current of about $10^{-8}$ amperes and detect and sense deviations of less than $8 \times 10^{-11}$ amperes in order to indicate 1% air volume fraction changes.

Due to the small total dynamic range of radiation transmission with variations in oil aeration, the electrometer voltage output should approximate linear dependence on oil aeration. Further linearizations are made in the data processing electronics. The linearized electrometer output and the linear temperature bridge output would be fed into appropriate electronics processing circuits. Compensation for any residual non-linearities in the output of the signal processing devices would be achieved by proper calibration of the readout meter.

ALTERNATIVE AERATION GAUGE CONSTRUCTIONS

Another type of density gauge used to measure the percent air entrained in oil is that shown in FIG. 6.

FIG. 6 shows a capacitance gauging system whereby a capacitance probe 90 containing a pair of separated electrodes 90a and 90b are positioned in the oil flow. A capacitance measuring circuit 92 is used to provide a signal on line 94 proportional to the capacitance exhibited by the probe electrodes. Reference may be had to U.S. Patent 3,222,918, issued Dec. 14, 1965, to L. Kuntz et al. for a more detailed description of a capacitance-type density gauge. A temperature probe 96 may be installed upstream from the capacitance probe and provides a signal on line 98 proportional to the temperature of the oil flow. Suitable correction of the capacitance signal by a unit 100 insures that the output signal on line 102 as indicated upon meter 104 remains substantially independent of temperature changes occurring in the oil.

A density gauge employing ultrasonic principles may be employed with substantially equal utility to measure the percent air entrained in the oil flow.

SUMMARY

I have described above preferred oil aeration gauging systems for aircraft engines. The selected density gauges can be manufactured in compact form to provide data on air entrainment. The data can be provided in analog or digital form for handling by on-board information processing equipments. The derived data may be used either for pilot warning or for purposes of automatically controlling the density of the oil to maintain a percent air entrainment below a maximum value computed from current flight data provided by on-board sensors.

Although certain specific embodiments of the invention have been shown and described herein, many modifications may be made thereto without departing from the true spirit and scope of the invention as set forth in the appended claims.

What is claimed is:

1. The method of determining the amount of air entrained in the lubrication fluid of an engine, comprising the steps of:
   continuously passing a beam of radiation into said fluid,
   continuously detecting the amount of radiation passing through said fluid, and
   correlating said detected amount of radiation with the amount of air entrained in said fluid.

2. Air entrainment gauging apparatus comprising:
   an engine,
   a lubrication system for said engine including
      a supply of lubricating fluid susceptible to having air entrained therein, and
      conduit means for conveying said fluid to and from said engine, and
   means for continuously measuring the density of said conveyed lubricating fluid to provide an indication of the amount of air entrained in said fluid.

3. Apparatus as in claim 2 in which said density measuring means comprises a radiation gauge.

4. Apparatus as in claim 2 which further includes means responsive to a predetermined value of said measured density for providing an alarm indication to operating personnel.

5. Apparatus as in claim 2 which further includes deaerator means in a line with said engine and system,
   means responsive to a predetermined value of said measured density for activating said deaerator means to automatically reduce the amount of air entrained in the lubricating fluid supplied to said engine.

6. In an aircraft engine subject to operation at high altitudes,
   a lubrication system for said engine including
      a supply of lubricating fluid susceptible to having air entrained therein, and
      conduit means for conveying said fluid to and from said engine,
   gauge means position on said conduit means for continuously monitoring the density of fluid flowing through said lubricating fluid to provide a signal proportional to the amount of air entrained in said fluid, and
   means responsive to said signal for indicating the percent of air entrained in said lubricating fluid.

7. Apparatus as in claim 6 which further includes means responsive to said signal for providing an alarm indication whenever said indicated amount of entrained air becomes excessive.

8. In an aircraft engine subject to operation at high altitudes,
   a lubrication system for said engine including
      a supply of lubricating fluid susceptible to having air entrained therein, and
      conduit means for conveying said fluid to and from said engine,
   gauge means positioned on the engine inlet side of said conduit means for continuously monitoring the fluid flowing through said lubricating fluid to provide a first signal proportional to the average density of said fluid, temperature sensing means for deriving a second signal indicative of the temperature of said fluid on the engine inlet side of said conduit, means for combining said signals to provide an output signal proportional to the percent air entrained in said fluid at a reference temperature.

9. In an aircraft having a plurality of engines subject to operation in high altitude regions, a lubrication system for each of said engines including
a supply of lubricating oil susceptible to having air entrained therein, and
inlet conduits extending from said supply to each of said engines for conveying oil thereto, density gauging means positioned on each of said engine inlet conduits for continuously monitoring the fluid flowing through said lubricating fluid to provide a first signal proportional to the density of said oil in said respective conduit, temperature sensing means positioned on each of said engine inlet conduits for providing a second signal proportional to the temperature of said oil in said respective conduit, means for combining said signals to provide an output signal proportional to the percent air entrained in said oil at a reference temperature, and alarm means responsive to said output signals for providing a warning whenever the percent of entrained air becomes excessive in any of said inlet conduits.

10. Apparatus as in claim 9 which further includes means for automatically monitoring only those engines operating in an excessive air entrainment condition.

11. In an aircraft having a plurality of engines subject to operation in high altitude regions, a lubrication system for each of said engines including
a supply of lubricating oil susceptible to having air entrained therein, and
inlet conduits extending from said supply to each of said engines for conveying oil thereto, density gauging means positioned on each of said engine inlet conduits for providing a first signal proportional to the density of said oil in said respective conduit, temperature sensing means positioned on each of said engine inlet conduits for providing a second signal proportional to the temperature of said oil in said respective conduit, means for combining said signals to provide an output signal proportional to the percent air entrained in said oil at a reference temperature, alarm means responsive to said output signals for providing a warning whenever the percent of entrained air becomes excessive in any of said inlet conduits, common amplifier means having an input and an output, means for coupling each of said output signals in seriatim to said amplifier input, and control means coupled to said amplifier output for automatically maintaining said percent air entrainment below a predetermined maximum value.

12. Control apparatus as set forth in claim 11 which includes means for adding oil to said lubrication system.

13. Control apparatus as set forth in claim 11 which includes
means for altering the recirculation of oil returned from said engines.

References Cited

UNITED STATES PATENTS

| | | |
|---|---|---|
| 2,482,806 | 9/1949 | Stahn. |
| 2,833,929 | 5/1958 | Barieau. |
| 3,161,203 | 12/1964 | Hathorn et al. _____ 137—91 X |
| 3,368,389 | 2/1968 | Barnett _____ 73—53 |
| 3,304,545 | 2/1967 | Bell et al. |
| 3,381,518 | 5/1968 | Loehle _____ 55—270 X |

LAVERNE D. GEIGER, Primary Examiner

EDWARD J. EARLS, Assistant Examiner

U.S. Cl. X.R.

55—160, 270; 73—19; 184—6; 250—43.5